(12) United States Patent
Thies et al.

(10) Patent No.: US 11,920,682 B2
(45) Date of Patent: Mar. 5, 2024

(54) SEPARATING DEVICE (71) Applicant: GLATT GMBH, Binzen (DE)

(72) Inventors: Jochen Thies, Lörrach (DE); Dirk Zimmermann, Wehr (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 57 days.

(21) Appl. No.: 17/611,310

(22) PCT Filed: Mar. 24, 2020

(86) PCT No.: PCT/EP2020/058113
§ 371 (c)(1),
(2) Date: Nov. 15, 2021

(87) PCT Pub. No.: WO2020/229029
PCT Pub. Date: Nov. 19, 2020

(65) Prior Publication Data
US 2022/0235864 A1    Jul. 28, 2022

(30) Foreign Application Priority Data

May 16, 2019    (DE) .................... 10 2019 207 167.8

(51) Int. Cl.
*F16J 15/46*    (2006.01)
*B65D 53/02*    (2006.01)

(52) U.S. Cl.
CPC ............... *F16J 15/46* (2013.01); *B65D 53/02* (2013.01)

(58) Field of Classification Search
CPC ........ F16J 15/022; F16J 15/024; F16J 15/027; F16J 15/028; F16J 15/068; F16J 15/46;
(Continued)

(56) References Cited

U.S. PATENT DOCUMENTS 3,385,604 A    5/1968 Traufler
4,073,521 A    2/1978 Mena
(Continued)

FOREIGN PATENT DOCUMENTS

CH    446211    10/1967
DE    876342 C    5/1953
(Continued)

OTHER PUBLICATIONS

Wang, et al., "The Start and Stop Reliability of Study a Dynamic Hydrodynamic Gas Bearing Gyroscope Motor", Small & Special Electrical Machines, Jun. 23, 2016, p. 17-22, No. 6.

*Primary Examiner* — Nicholas L Foster
(74) *Attorney, Agent, or Firm* — The Webb Law Firm (57) ABSTRACT

A separating device with a separating unit for separating and sealing two chambers of a container. The separating unit includes a main body which has a radial outer peripheral surface designed as a sealing surface. The separating unit includes a support structure arranged in the region of the outer periphery, the main body with the support structure forms a receiving space which at least partly receives the inflatable seal, and the separating unit in the installed state is arranged in the container which includes a container wall which forms the counter scaling surface in a manner such that the scaling surface is annularly enclosed by the counter sealing surface.

16 Claims, 4 Drawing Sheets

(58) Field of Classification Search
CPC ........ B65D 53/00; B65D 53/02; B65D 53/04; B65D 90/0066
See application file for complete search history.

(56) References Cited

U.S. PATENT DOCUMENTS

| | | | |
|---|---|---|---|
| 5,078,873 A | | 1/1992 | Black et al. |
| 5,114,054 A | * | 5/1992 | Watson .................. B65D 88/60 277/467 |
| 5,291,923 A | * | 3/1994 | Gallagher ......... H01L 21/67376 414/217 |
| 5,766,557 A | | 6/1998 | Luy et al. |
| 7,856,715 B2 | * | 12/2010 | Pays ...................... B65D 88/60 220/524 |
| 8,137,543 B2 | * | 3/2012 | Pays .................. B01D 17/0211 210/DIG. 5 |
| 9,376,288 B2 | | 6/2016 | Satola |
| 10,563,763 B1 | * | 2/2020 | DeJohn .................. F15B 15/10 |
| 2009/0014451 A1 | * | 1/2009 | Pays .................. B01D 17/0214 210/708 |
| 2010/0148452 A1 | | 6/2010 | Westhoff et al. |
| 2011/0049160 A1 | * | 3/2011 | Pays .................... B01D 17/045 220/526 |
| 2013/0234401 A1 | | 9/2013 | Smith |

FOREIGN PATENT DOCUMENTS

| | | |
|---|---|---|
| DE | 29808121 U1 | 7/1998 |
| EP | 0781949 A1 | 7/1997 |
| EP | 1559466 A1 | 8/2005 |
| FR | 2171688 A5 | 9/1973 |
| JP | 60157717 U | 10/1985 |
| JP | 2014514995 A | 6/2014 |
| JP | 20167567 A | 1/2016 |

\* cited by examiner

SEPARATING DEVICE

CROSS-REFERENCE TO RELATED APPLICATIONS

This application is the United States national phase of International Application No. PCT/EP2020/058113 filed Mar. 24, 2020, and claims priority to German Patent Application No. 10 2019 207 167.8 filed May 16, 2019, the disclosures of which are hereby incorporated by reference in their entirety.

BACKGROUND

Field

The invention relates to a separating device with a separating unit for separating and sealing two chambers of a container, wherein the separating unit comprises a main body which has a radial outer peripheral surface which is designed as a sealing surface.

Related Art

Inflatable seals are applied in the state of the art for the separation and sealing of moving components such as filter plates or foldable onflow bases, in order to avoid process gas flowing laterally through a gap, in particular an annular gap, which is formed between the movable components which are subjected to through-flow and a container wall. For this, the inflatable seals are assembled in a groove which is formed in the movable component. The inflatable seal in the state in which it subjected to pressure, on account of the shape intrinsic of the groove, is forced to expand in the direction of the container wall, which is designed as a sealing surface, by which means a very robust sealing is created between the components which are to be sealed off.

The disadvantage of this installation manner which is known from the state of the art is the fact that a clean-in-place (CIP) cleaning of the groove and of the inflatable seal which is brought into the groove is not possible. It is therefore necessary to remove the inflatable seal and to manually clean the groove as well as the inflatable seal for a cleaning result which can be validated. For this reason, concerning Super Clean (SC) facilities which are designed for an automatic residue-free cleaning, if possible one makes do without the use of inflatable seals. For achieving the complete functionality of the facility, this forgoing of inflatable seals entails technical replacement solutions which are complicated in design.

SUMMARY

It is therefore the object of the invention to provide a separating device which permits CIP cleaning and is designed for the automatic, residue-free cleaning of SC facilities. Concerning a separating device of the initially mentioned type, this object is achieved by way of the separating unit comprising a support structure which is arranged in the region of the outer periphery, the main body with the support structure forming a receiving space which at least partly receives the inflatable seal, and the separating unit in the installed state being arranged in the container which comprises a container wall which forms the counter sealing surface, in a manner such that the sealing surface is annularly enclosed by the counter sealing surface, so that the inflatable seal in the pressure-free, relaxed state is arranged loosely in the receiving space and in the state in which it is subjected to pressure is expanded and bears on the sealing surface as well as the counter sealing surface, so that the inflatable seal separates the container into two chambers and seals these with respect to one another.

Advantageously, the separating device according to the invention which is designed in the manner of a support basket permits the validated cleaning process of an automated CIP cleaning of sealing seats of inflatable seals, in particular in fluidisation apparatus such as fluidised bed or spouted bed apparatus.

Further advantageously, it is possible to allow the separating unit of the separating device to be peripherally rinsed by cleaning water during the cleaning process. The separating device with a separating unit is therefore capable of CIP.

Further advantages of the design according to the invention of the separating device with a separating unit are specified hereinafter. Instead of a groove which presupposes a solid component, and which must be machined on manufacture which requires some effort, a support structure in the manner of a filigree, grid-like support basket is arranged on the main body, by which means the separating device becomes significantly more lightweight in comparison to the solid component with a groove. Furthermore, an automated CIP cleaning of the facility is possible without any problem even with an installed inflatable seal. For this, for example a cleaning system with a multitude of nozzles which is built into the facility is used. It is likewise advantageous for an insertion of the inflatable seal into the receiving space of the separating unit of the separating device and a removal of the inflatable seal out of this to be possible without a tool. The aforementioned working steps are therefore effected significantly more rapidly and simply than technical solutions which are known from the state of the art.

According to an advantageous embodiment of the separating device according to the invention, the support structure each comprises a support structure unit which is arranged above and below the main body. The receiving space which at least partly receives the inflatable seal is advantageously formed by the support structure unit which is arranged above the main body and the support structure unit which is arranged below the main body. According to a particularly advantageous embodiment, the receiving space is designed in a trough-like manner. On account of this embodiment, the inflatable seal is also held in position, i.e., in the receiving space, between the sealing surface and the counter sealing surface, even in the pressure-free relaxed state.

In a further development of the separating device, which is preferably in respect to this, the support structure units are each designed in a grid-like manner. By way of this, it is rendered possible for the inflatable seal to be held in position in the state in which it is subjected to pressure and to simultaneously undergo a directed expansion in the direction of the container wall which forms the counter sealing surface, for sealing and separation of the two chambers of the container.

Furthermore, on account of the grid-like construction manner, it is ensured that the inflatable seal and the separating device, in particular the separating unit, are always cleaned in an optimal manner, so that an automated CIP cleaning which fulfils the validated cleaning process can be carried out simply and reliably by way of a cleaning system.

In a further embodiment according to the invention, the support structure comprises a multitude of support arms. The support arms preferably have an arcuate cross section.

Advantageously, ring structures which are aligned radially to one another in the circumferential direction of the main body are arranged on the multitude of support arms. Particularly preferably, the ring structures can be formed or are formed by way of struts between the support arms. By way of such an embodiment of the separating device according to the invention, the separating device is constructed in a very lightweight construction manner given a simultaneous high stability and furthermore can be manufactured in a very inexpensive manner with regard to the manufacturing costs.

Furthermore, the ring structures and the main body are aligned coaxially to one another with respect to a separating unit main axis and furthermore are arranged at a mutual axial distance to one another. According to an additional advantageous embodiment, the ring structures have a larger diameter with an increasing distance to the main body. Furthermore, between the ring structures which have a larger diameter with an increasing distance to the main body, a distance between two ring structures which are aligned to one another reduces with an increasing distance to the main body. By way of this, the lightweight construction manner of the separating unit is additionally encouraged.

BRIEF DESCRIPTION OF THE DRAWINGS

The invention is hereinafter explained in more detail by way of the accompanying drawing. In this are shown in FIG. 1 an inflatable seal according to the state of the art, said seal being arranged in a groove and sealing a main body with respect to a container which comprises a container wall, FIG. 2 a partly sectioned representation of a container with a separating device which comprises a separating unit, in the state in which it is installed in the container, FIG. 3 a perspective partly sectioned representation of an inflatable seal which is received in a receiving space of the separating unit of the separating device in a pressure-free, relaxed state, wherein the receiving space is designed in a trough-like manner and FIG. 4 a perspective partly sectioned representation of an inflatable seal which is received in a receiving space of the separating unit of the separating device in the state in which it is subjected to pressure, wherein the receiving space is designed in a trough-like manner.

DETAILED DESCRIPTION

Figure 1:
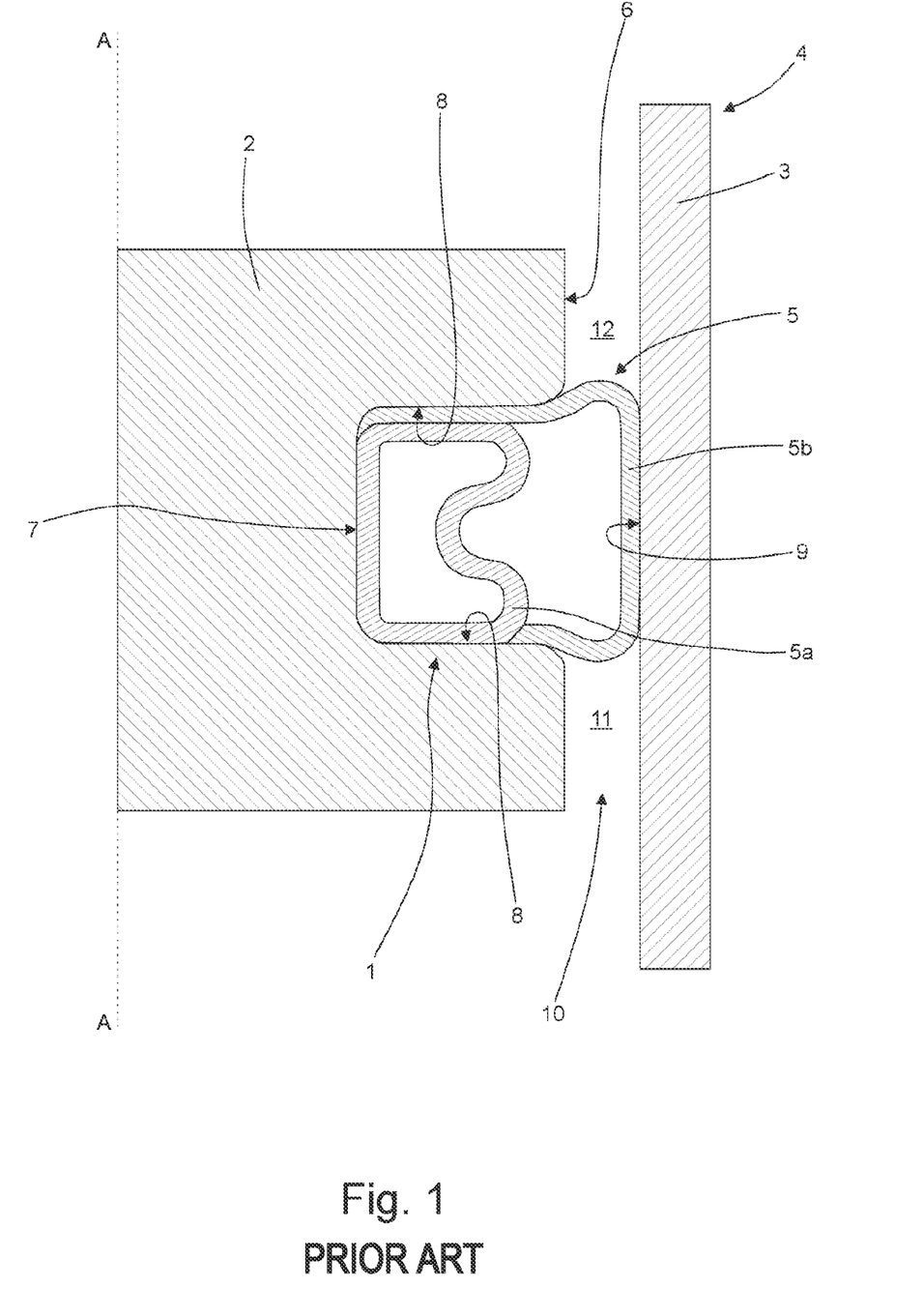

FIG. 1 shows an inflatable seal 5 according to the state of the art, said seal being arranged in a groove 1 and sealing a main body 2 with respect to a container 4 which comprises a container wall 3.

The formed groove 1 is arranged in a main body 2, for example a filter plate or an onflow base of a fluidisation apparatus, in particular of a fluidised bed apparatus or spouted bed apparatus and comprises a groove base 7 which is offset parallel to the outer peripheral surface 6 in the direction of a container middle axis A-A, and two groove side surfaces 8 which are arranged essentially perpendicularly to the groove base 7. Such an embodiment of the groove 1 is denoted as a "closed groove". The inflatable seal 5 in the pressure-free, relaxed sate is arranged in the groove 1 in a loose manner as an inflatable seal 5a. The inflatable seal 5a which is arranged loosely in the groove 1 hereby bears on the groove base 7 and on a groove side surface 8.

In the state in which it is subjected to pressure, the inflatable seal 5 which is represented as an inflatable seal 5b is expanded against the groove base 7, the groove side surfaces 8 and the container wall 3 of the container 4 which is designed as a counter sealing surface 9, for example of a fluidisation apparatus, such as in particular a fluidised bed apparatus or spouted bed apparatus. The inflatable seal 5b thus in the state in which it is subjected to pressure seals an annular gap 10 which is formed between the main body 2 and the container wall 3, and therefore separates two chambers, for example a raw gas chamber 11 and a pure gas chamber 12 of the container 4, from one another.

This installation manner of the groove 1 which is known from the state of the art has the disadvantage that for example a CIP cleaning of the groove 1 and of the inflatable seal 5 which is brought into the groove 1 is not possible and hence the inflatable seal 5 is necessarily to be disassembled out of the groove 1 and the inflatable seal 5 as well as the groove 1 manually cleaned of residues of the previously carried out process, for a validatable cleaning result.

Figure 2:
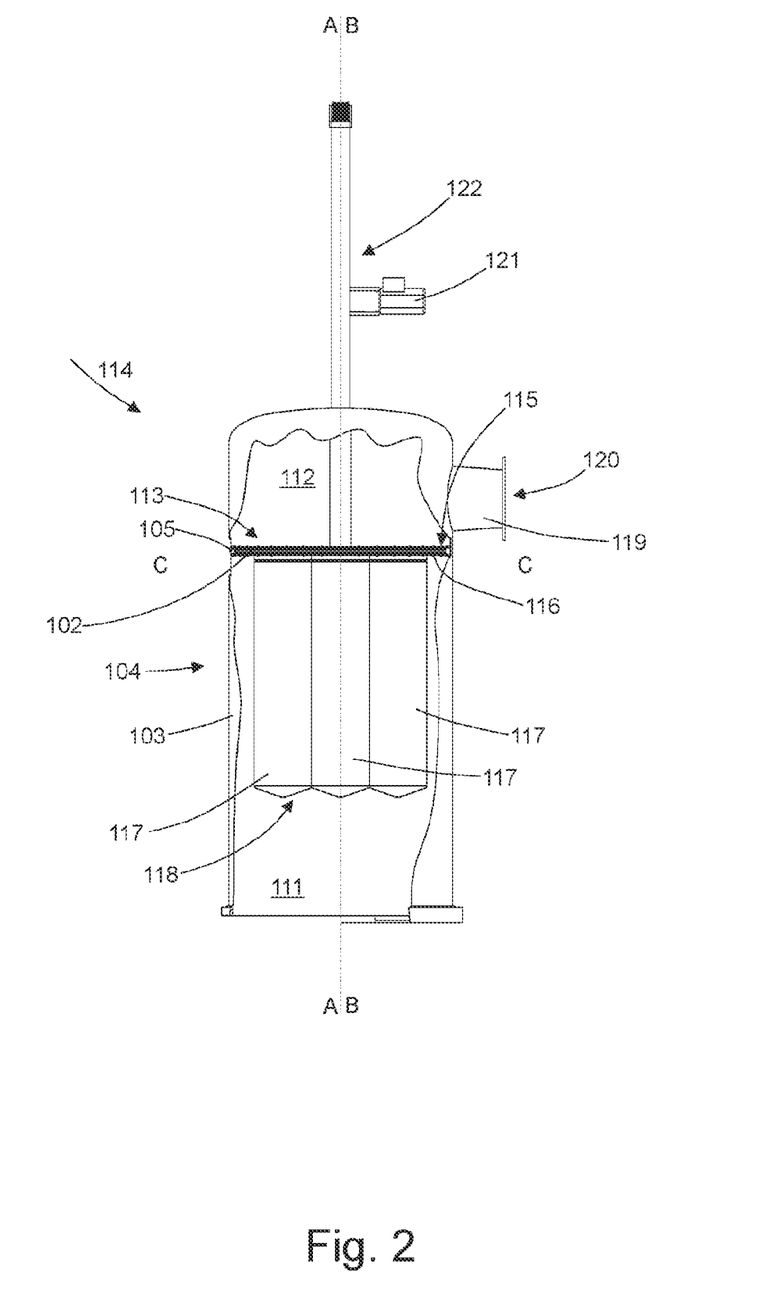

A partly sectioned representation of a container 104 which has a container middle axis A-A and a container wall 103, with a preferred separating device 114 which comprises a separating unit 114 in the installed state is shown in FIG. 2. The container middle axis A-A hereby corresponds to a separating unit main axis B-B.

The separating unit 113 comprises a main body 102 and a support structure 116 which is arranged in the region of the outer periphery 115 of the separating unit 113. The inflatable seal 105 is arranged between the main body 102, the support structure 116 which is arranged in the region of the outer periphery 115 of the separating unit 113 and the container wall 103 of the container 104. The separating unit 113 of the preferred separating device 114 hereby by way of the inflatable seal 105 separates a raw gas chamber 111 of the container 104 from a clean gas chamber 112 of the container 104. Here, the separating unit 113 is designed as a filter plate.

A filter system 118 which comprises a filter 117, in particular a metal filter is arranged on the one separating unit middle axis C-C, wherein the separating unit middle axis C-C is aligned perpendicularly to the separating unit main axis B-B. A gas flow which is contaminated with particles, and which is to be cleaned by the filter system 118 flows from an inlet which is not shown here, into the raw gas chamber 111, from there via the filter 117 of the filter system 118 for cleaning the gas flow, which is contaminated with particles, into the pure gas chamber 112 and out of the pure gas chamber 112 via an outlet 120 which is designed as a pipe stub 119.

The separating unit 113 is can be retracted and extended out of the container 104 by way of a displacement device 122 which is drivable or is driven by way of a drive unit 21, in particular an electric motor or the like. This functionality is used for example for cleaning the filter 117 of the filter system 118.

Figure 3:
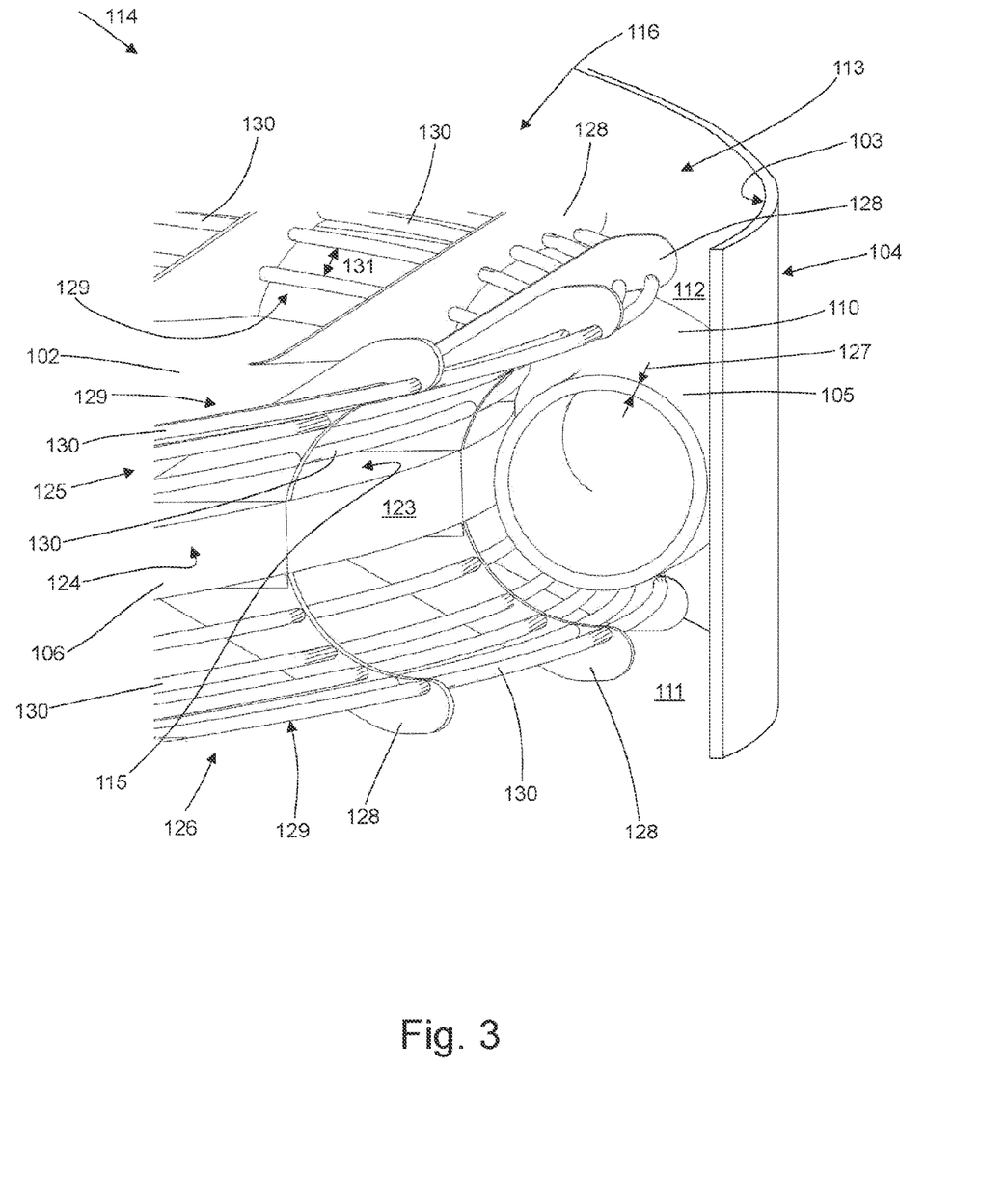
Figure 4:
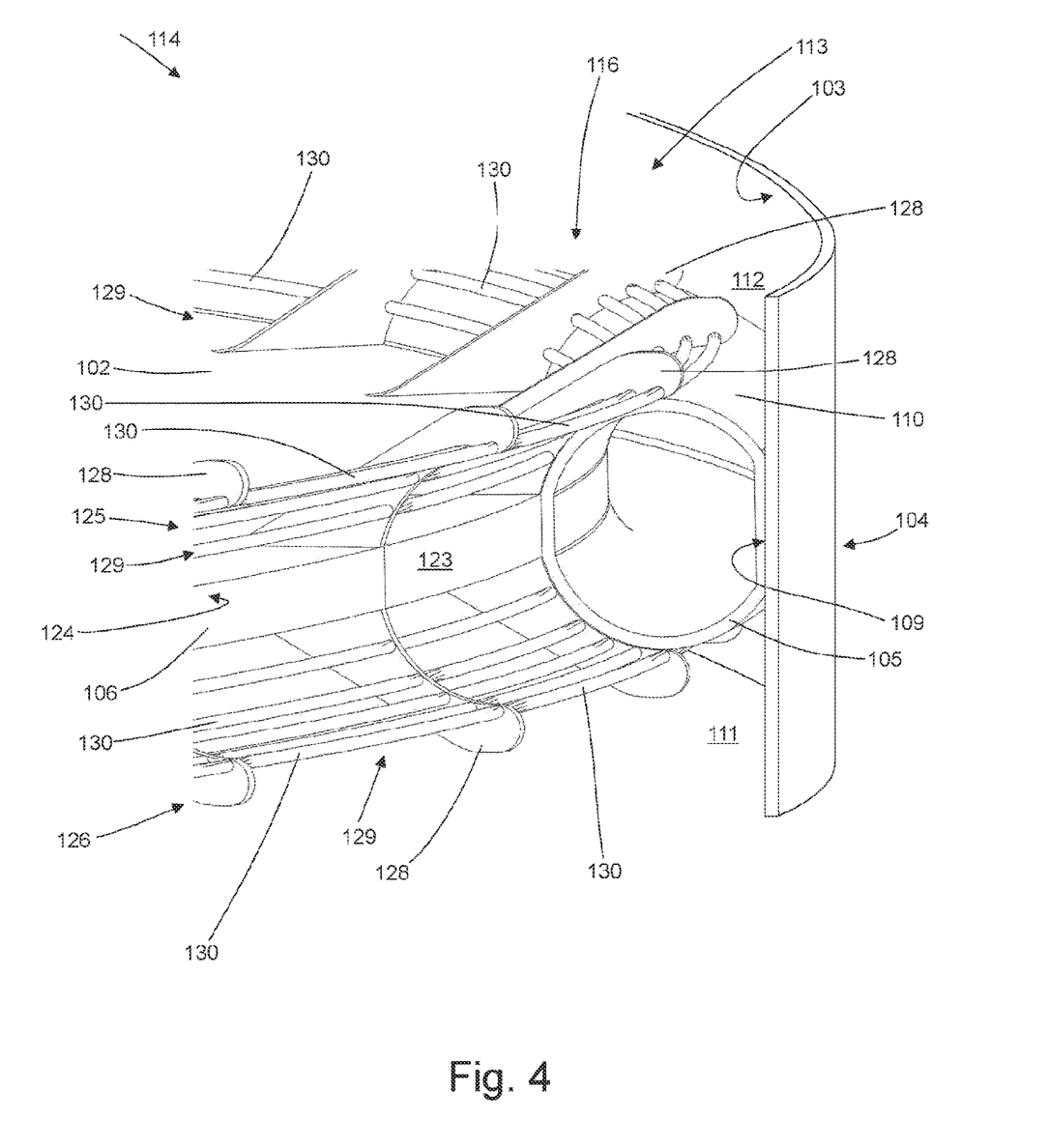

The detailed construction of the preferred separating device 114 with a separating unit 113 is explained in more detail in FIGS. 3 and 4 in a perspective partly sectioned representation.

The separating unit 113 is shown in FIGS. 3 and 4 in the state in which it is installed in the container 104. FIG. 3 hereby shows a perspective partly sectioned representation of an inflatable seal 105 which is received in a receiving space 123 of the separating unit 113 of the preferred separating device 114 in the pressure-free, relaxed state, wherein the receiving space is designed in a trough-like manner. The inflatable seal 105 is not inflated, in the pressure-free, relaxed state.

The separating unit 113 comprises a main body 102 which comprises a radial outer peripheral surface 106 which is designed as a sealing surface 124.

The main body 102 is arranged coaxially to a container 104 which comprises a container wall 103. The main body 102 has a smaller diameter that the container 102, so that an annular gap 110 forms between the container wall 103 and the main body 102.

Furthermore, the separating unit 113 comprises a support structure 116 which is arranged in the region of its outer periphery 115. The support structure 116 comprises a support structure unit 125 which is arranged above the main body 102 and a support structure unit 126 which is arranged below the main body 102. The main body 102 and the support structure 116 from the receiving space 123 which at least partly receives the inflatable seal 105 which has a wall thickness 127. The receiving space 123 of the separating unit 113 which is hence generated for the at least partial receiving of the inflatable seal 105 is designed in a trough-like manner. By way of this design, the inflatable seal 105 is also held in its position in the pressure-free, relaxed state.

The support structure 116 comprises a multitude of support arms 128 which have an arcuate cross section. Ring structures 129 which are aligned radially to one another in the circumferential direction of the main body 102 are arranged on the multitude of support arms 128. The ring structures 129 as is shown in FIG. 3 are preferably formed by struts 130 between two adjacent support arms 128. The struts 130 which are arranged radially in the peripheral direction of the main body 102 on the multitude of the support arms 128 are accordingly also aligned to one another. On account of the ring structures 129 which are aligned to one another, the support structure units 125, 126 of the support structure 115 are each designed in a grid-like manner. By way of this, the separating device 114 is designed in a very lightweight construction manner with as simultaneous high stability and furthermore can be manufactured in a very economical manner with regard to the manufacturing costs.

Moreover, by way of this it is possible for the inflatable seal 105 to be held in position in the state in which it is subjected to pressure and to simultaneously undergo a directed expansion for the sealing and separation of the two chambers 111, 112 of the container 104. Furthermore, on account of the grid-like construction manner, it is ensured that the inflatable seal 105 and the separating device 114, in particular the separating unit 113 is always optimal to clean, so that an automated CIP cleaning which fulfils the validated cleaning process can be carried out in a simple and reliable manner.

Furthermore, the ring structures 129 and the main body 102 are aligned coaxially to one another with respect to a separating unit main axis B-B and are furthermore arranged at a mutual axial distance to one another. Furthermore, the ring structures 129 have a larger diameter with an increasing distance to the main body 102.

Between the ring structures 129 which have a larger diameter with an increasing distance to the main body 102, a distance 131 between two ring structures 129 which are aligned to one another decreases with an increasing distance to the main body 102. By way of this, the lightweight construction manner of the separating device 114 with the separating unit 113 is additionally encouraged.

The number of support arms 128 themselves which are arranged on the main body 102 as well as the number of ring structures 129 which are arranged between the support arms 128 can vary.

The ring structures 129 which are formed by the struts 130 can also be arranged between the support arms 128 differently than coaxially to one another, for example in an oblique, meandering or cross-like manner.

It is possible to permit the separating unit 113 of the separating device 114 to be peripherally rinsed by cleaning water during the cleaning process, i.e., in the pressure-free, relaxed state by way of nozzle devices which are not shown here and are arranged in the container 104. The separating device 114 is therefore capable of CIP. Furthermore, an automated CIP cleaning of the facility is also possible without any problem with an installed inflatable seal 105.

FIG. 4 as a perspective partly sectioned representation shows an inflatable seal in the state in which it is subjected to pressure, said seal being received in a receiving space 123 of the separating unit 113 of the separating device 114 and said receiving space being designed in a trough-like manner. The separating unit 113 of the separating device 114 differs from the separating unit 113 which is represented in FIG. 3 in that the inflatable seal 105 is subjected to pressure, i.e., is inflated. The separating unit 113 in the installed state is arranged in the container 104 which comprises the container wall 103 which forms a counter sealing surface 109, in a manner such that the sealing surface 124 is annularly enclosed by the counter sealing surface 109. By way of this, the inflatable seal 105 is arranged loosely in the receiving space 123 in the pressure-free, relaxed state. In the state in which it is subjected to pressure which is shown in FIG. 4, the inflatable seal 105 expands and bears on the sealing surface 124 as well as on the container wall 103 of the container 104 which is designed as a counter sealing surface 109, so that the inflatable seal 105 divides the container 105 into two chambers, specifically into a raw gas chamber 111 and a clean gas chamber and seals these with respect to one another. The inflatable seal 105 thus fills out the annular gap 110 in the state in which it is subjected to pressure.

Additionally, an expansion of the inflatable seal 105 which is subjected to pressure is guided by way of the trough-like receiving space 123 which is formed by the main body 102 and the support structure 116, so that an expansion of the inflatable seal 105 is effected essentially in the direction of the separating unit middle axis C-C which is not shown here, i.e. in the direction of the sealing surface 124 and counter sealing surface 109.

The invention claimed is:

1. A separating device with a separating unit for separating and sealing two chambers of a container, wherein the separating unit comprises a main body which has a radial outer peripheral surface which is designed as a sealing surface, wherein the separating unit comprises a support structure which is arranged in a region of an outer periphery of the separating unit, the main body with the support structure forms a receiving space which at least partly receives an inflatable seal, wherein the sealing surface is configured to be annularly enclosed by a counter sealing surface of a container wall of the container when the separating unit is arranged in the container in an installed state thereof, so that the inflatable seal in a pressure-free, relaxed state is arranged loosely in the receiving space and in a state in which it is subjected to pressure is expanded and bears on the sealing surface and is configured to bear on the counter sealing surface, so that the inflatable seal separates the container into two chambers and seals these with respect to one another, wherein the support structure comprises a first support structure which is arranged above the main body and a second support structure which is arranged below the main body, and wherein the first and second support structures are each designed in a grid-like manner.

2. The separating device according to claim 1, wherein the support structure comprises a plurality of support arms which have an arcuate cross section.

3. The separating device according to claim 2, wherein ring structures which are aligned radially with one another in a circumferential direction of the main body are arranged on the plurality of support arms.

4. The separating device according to claim 3, wherein the ring structures are formed by struts between the support arms.

5. The separating device according to claim 3, wherein the ring structures and the main body are aligned coaxially with one another with respect to a separating unit main axis (B-B) and furthermore are arranged at a mutual axial distance to one another.

6. The separating device according to claim 3, wherein the ring structures have a larger diameter with an increasing distance from the main body.

7. The separating device according to claim 6, wherein between the ring structures, a distance between two ring structures which are aligned with one another reduces with an increasing distance from the main body.

8. The separating device according to claim 3, wherein the receiving space is designed in a trough-like manner.

9. A separating device with a separating unit for separating and sealing two chambers of a container, wherein the separating unit comprises a main body which has a radial outer peripheral surface which is designed as a sealing surface, wherein the separating unit comprises a support structure which is arranged in a region of an outer periphery of the separating unit, the main body with the support structure forms a receiving space which at least partly receives an inflatable seal, wherein the sealing surface is configured to be annularly enclosed by a counter sealing surface of a container wall of the container when the separating unit is arranged in the container in an installed state thereof, so that the inflatable seal in a pressure-free, relaxed state is arranged loosely in the receiving space and in a state in which it is subjected to pressure is expanded and bears on the sealing surface and is configured to bear on the counter sealing surface, so that the inflatable seal separates the container into two chambers and seals these with respect to one another, wherein the support structure comprises a plurality of support arms which have an arcuate cross section, and wherein ring structures which are aligned radially with one another in a circumferential direction of the main body are arranged on the plurality of support arms.

10. The separating device according to claim 9, wherein the support structure comprises a first support structure which is arranged above the main body and a second support structure which is arranged below the main body.

11. The separating device according to claim 10, wherein the first and second support structures are each designed in a grid-like manner.

12. The separating device according to claim 9, wherein the ring structures are formed by struts between the support arms.

13. The separating device according to claim 9, wherein the ring structures and the main body are aligned coaxially with one another with respect to a separating unit main axis (B-B) and furthermore are arranged at a mutual axial distance to one another.

14. The separating device according to claim 9, wherein the ring structures have a larger diameter with an increasing distance from the main body.

15. The separating device according to claim 14, wherein between the ring structures, a distance between two ring structures which are aligned with one another reduces with an increasing distance from the main body.

16. The separating device according to claim 9, wherein the receiving space is designed in a trough-like manner.

* * * * *

UNITED STATES PATENT AND TRADEMARK OFFICE
CERTIFICATE OF CORRECTION

| | |
|---|---|
| PATENT NO. | : 11,920,682 B2 |
| APPLICATION NO. | : 17/611310 |
| DATED | : March 5, 2024 |
| INVENTOR(S) | : Jochen Thies et al. |

It is certified that error appears in the above-identified patent and that said Letters Patent is hereby corrected as shown below:

On the Title Page

Column 2, Abstract, Line 10, delete "scaling" and insert -- sealing --

Column 2, Abstract, Line 11, delete "scaling" and insert -- sealing --

Signed and Sealed this
Thirtieth Day of April, 2024

Katherine Kelly Vidal
*Director of the United States Patent and Trademark Office*